US012773989B2

(12) United States Patent
Ario

(10) Patent No.: US 12,773,989 B2
(45) Date of Patent: Oct. 27, 2026

(54) TRAJECTORY PROCESSING SYSTEM ADJUSTING DISTANCE INTERVAL BETWEEN ADJACENT PREDICTION POINTS AS PREDICTION INTERVAL

(71) Applicant: DENSO CORPORATION, Kariya-city (JP)

(72) Inventor: Takuma Ario, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 179 days.

(21) Appl. No.: 18/409,587

(22) Filed: Jan. 10, 2024

(65) Prior Publication Data

US 2024/0140415 A1 May 2, 2024

Related U.S. Application Data

(63) Continuation of application No. PCT/JP2022/024687, filed on Jun. 21, 2022.

(30) Foreign Application Priority Data

Jul. 15, 2021 (JP) ................................ 2021-117370

(51) Int. Cl.
*B60W 30/10* (2006.01)
*B60W 10/20* (2006.01)
*B60W 50/00* (2006.01)
*B60W 60/00* (2020.01)

(52) U.S. Cl.
CPC ............ *B60W 30/10* (2013.01); *B60W 10/20* (2013.01); *B60W 50/0097* (2013.01); *B60W 60/001* (2020.02)

(58) Field of Classification Search
CPC .. B60W 30/10; B60W 10/20; B60W 50/0097; B60W 60/001; B60W 2710/207; B62D 6/00; B62D 15/025; G08G 1/16
See application file for complete search history.

(56) References Cited

U.S. PATENT DOCUMENTS

| | | | | |
|---|---|---|---|---|
| 2014/0240115 | A1* | 8/2014 | Igarashi | B60W 30/09 340/435 |
| 2018/0261094 | A1* | 9/2018 | Nishimura | G08G 1/16 |
| 2018/0339670 | A1* | 11/2018 | Nishimura | B60W 10/20 |
| 2018/0348786 | A1 | 12/2018 | Yasui | |
| 2019/0235505 | A1* | 8/2019 | Li | G08G 1/163 |
| 2020/0079379 | A1 | 3/2020 | Mimura | |
| 2020/0189592 | A1* | 6/2020 | Jang | B60W 30/10 |

(Continued)

FOREIGN PATENT DOCUMENTS

| | | |
|---|---|---|
| JP | 2018140735 | 9/2018 |

*Primary Examiner* — Sze-Hon Kong
(74) *Attorney, Agent, or Firm* — Precision Patents, P.C.

(57) ABSTRACT

A vehicle is caused to track a target trajectory in future travel of the vehicle. A prediction trajectory is generated and obtained by predicting a state quantity of the vehicle in time series at a plurality of prediction points so as to approach the target trajectory. A steering command is output for operating the vehicle according to the prediction trajectory. The generating of the prediction trajectory includes: adjusting a plurality of prediction intervals to be wider as a distance from the vehicle increases. The prediction intervals are defined as an interval between adjacent prediction points in a prediction section for generating the prediction trajectory.

4 Claims, 15 Drawing Sheets

(56) References Cited

U.S. PATENT DOCUMENTS

| | | | | |
|---|---|---|---|---|
| 2021/0325197 | A1 | 10/2021 | Ohmura et al. | |
| 2022/0242449 | A1 | 8/2022 | Sakayori et al. | |
| 2024/0149920 | A1* | 5/2024 | Zheng | B60W 40/04 |
| 2024/0199083 | A1* | 6/2024 | Chang | B60W 50/0097 |
| 2025/0002049 | A1* | 1/2025 | Tam | B60W 60/001 |
| 2025/0010861 | A1* | 1/2025 | Ishihara | B60W 60/0025 |

* cited by examiner

TRAJECTORY PROCESSING SYSTEM ADJUSTING DISTANCE INTERVAL BETWEEN ADJACENT PREDICTION POINTS AS PREDICTION INTERVAL

CROSS REFERENCE TO RELATED APPLICATION

The present application is a continuation application of International Patent Application No. PCT/JP2022/024687 filed on Jun. 21, 2022, which designated the U.S. and claims the benefit of priority from Japanese Patent Application No. 2021-117370 filed on Jul. 15, 2021. The entire disclosures of all of the above applications are incorporated herein by reference.

TECHNICAL FIELD

The present disclosure relates to a trajectory processing technology that causes a vehicle to track a target trajectory.

BACKGROUND

A technique for causing a vehicle to follow a target trajectory is conceivable in a conceivable technique, for example. In the conceivable technique, a prediction trajectory is generated using model prediction control. The model prediction control predicts a state quantity at multiple prediction points in a future prediction section, and generates a prediction trajectory with the best prediction result.

SUMMARY

According to an example, a vehicle is caused to track a target trajectory in future travel of the vehicle. A prediction trajectory is generated and obtained by predicting a state quantity of the vehicle in time series at a plurality of prediction points so as to approach the target trajectory. A steering command is output for operating the vehicle according to the prediction trajectory. The generating of the prediction trajectory includes: adjusting a plurality of prediction intervals to be wider as a distance from the vehicle increases. The prediction intervals are defined as an interval between adjacent prediction points in a prediction section for generating the prediction trajectory.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
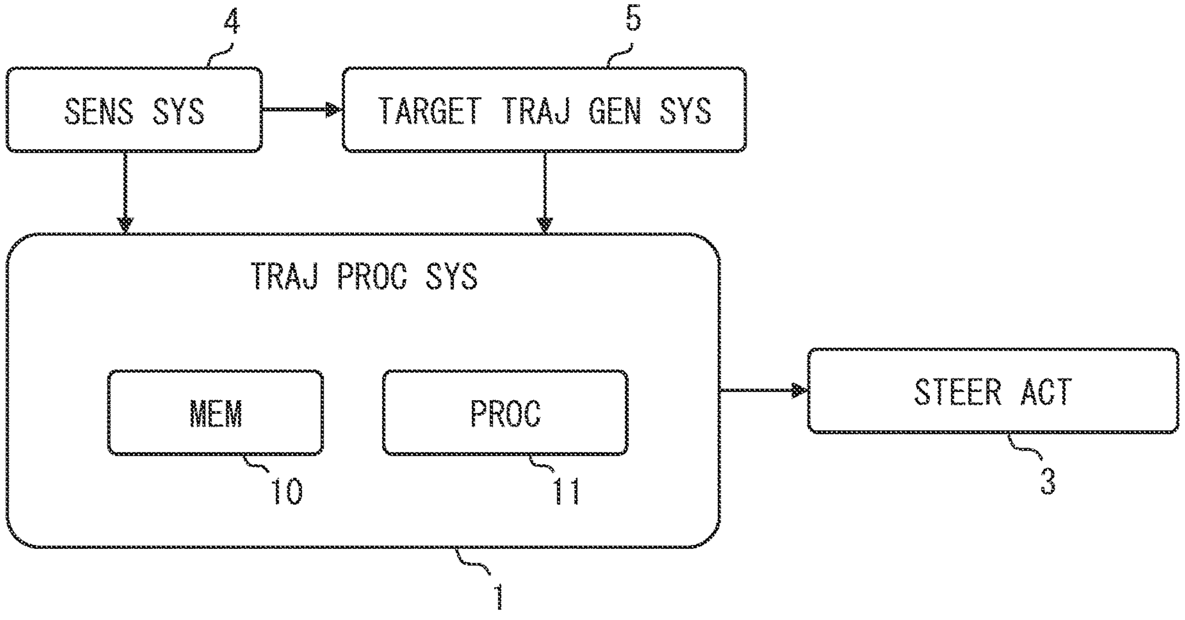
FIG. 1 is a schematic diagram showing the overall configuration of a first embodiment.

In the model prediction control according to the conceivable technique, since the state quantity is given for each prediction point, it may be preferable to set the interval between the prediction points narrowly in order to improve the tracking performance of the vehicle to the target trajectory. On the other hand, in the model prediction control, the state quantity is calculated for each prediction point. Therefore, in order to reduce the calculation load according to the number of prediction points, it may be preferable to set the interval between the prediction points widely. Here, with the conceivable technique, since the prediction points are set at equal intervals, it is difficult to achieve both of these conflicting objectives.

The present embodiments provide a trajectory processing system that achieves both suppression of reduction in trajectory tracking performance and reduction of calculation load. The present embodiments also provide a trajectory processing device that achieves both suppression of reduction in trajectory tracking performance and reduction of calculation load. The present embodiments also provide a trajectory processing method that achieves both suppression of reduction in trajectory tracking performance and reduction of calculation load. The present embodiments also provide a trajectory processing program that achieves both suppression of reduction in trajectory tracking performance and reduction of calculation load.

According to the present embodiments, a trajectory processing system, for executing a trajectory processing to cause a vehicle to track a target trajectory in future travel of the vehicle, includes a processor.

The processor is configured to execute:

- generating a prediction trajectory obtained by chronologically predicting state quantities of the vehicle at a plurality of prediction points so as to approach a target trajectory; and
- outputting a steering command for operating the vehicle according to the prediction trajectory.

The generating of the prediction trajectory includes adjusting a plurality of prediction intervals to be wider as a distance from the vehicle increases.

Each prediction interval is defined as a distance between adjacent prediction points in a prediction section for generating the prediction trajectory.

According to the present embodiments, a trajectory processing device, for executing a trajectory processing to cause a vehicle to track a target trajectory in future travel of the vehicle, includes a processor.

The processor is configured to execute:

generating a prediction trajectory obtained by chronologically predicting state quantities of the vehicle at a plurality of prediction points so as to approach a target trajectory; and outputting a steering command for operating the vehicle according to the prediction trajectory.

The generating of the prediction trajectory includes adjusting a plurality of prediction intervals to be wider as a distance from the vehicle increases.

Each prediction interval is defined as a distance between adjacent prediction points in a prediction section for generating the prediction trajectory.

According to the present embodiments, a trajectory processing method executed by a processor for causing a vehicle to track a target trajectory in future travel of the vehicle.

The trajectory processing method includes:

generating a prediction trajectory obtained by chronologically predicting state quantities of the vehicle at a plurality of prediction points so as to approach a target trajectory; and outputting a steering command for operating the vehicle according to the prediction trajectory.

The generating of the prediction trajectory includes adjusting a plurality of prediction intervals to be wider as a distance from the vehicle increases.

Each prediction interval is defined as a distance between adjacent prediction points in a prediction section for generating the prediction trajectory.

According to the present embodiments, a trajectory processing program is stored in a storage medium and includes instructions to be executed by a processor to cause a vehicle to track a target trajectory in future travel of the vehicle.

The instructions include:

generating a prediction trajectory obtained by chronologically predicting state quantities of the vehicle at a plurality of prediction points so as to approach a target trajectory; and outputting a steering command for operating the vehicle according to the prediction trajectory.

The generating of the prediction trajectory includes adjusting a plurality of prediction intervals to be wider as a distance from the vehicle increases.

Each prediction interval is defined as a distance between adjacent prediction points in a prediction section for generating the prediction trajectory.

According to the above aspects, the prediction interval between successive prediction points that define the state quantity to be given to the vehicle in generating the prediction trajectory is adjusted so as to widen as the distance from the vehicle increases. According to this, even if the prediction interval on the side closer to the vehicle is narrowed in order to improve the trajectory tracking performance, the prediction interval on the side farther from the vehicle is widened, so that the total number of prediction points in the prediction section can be suppressed from increasing. Therefore, it is possible to reduce the calculation load for generating the prediction trajectory while suppressing reduction of the trajectory tracking performance.

According to the present embodiments, a non-transitory tangible computer readable storage medium includes instructions being executed by a processor to cause a vehicle to track a target trajectory in future travel of the vehicle.

The instructions includes:

generating a prediction trajectory obtained by predicting a state quantity of the vehicle in time series at a plurality of prediction points so as to approach the target trajectory; and outputting a steering command for operating the vehicle according to the prediction trajectory.

The generating of the prediction trajectory includes: adjusting a plurality of prediction intervals to be wider as a distance from the vehicle increases.

The prediction intervals are defined as an interval between adjacent prediction points in a prediction section for generating the prediction trajectory.

The adjusting of the prediction intervals includes: adjusting a distance interval between adjacent prediction points as the prediction interval.

According to the present embodiments, a non-transitory tangible computer readable storage medium includes instructions being executed by a processor to cause a vehicle to track a target trajectory in future travel of the vehicle.

The instructions includes:

generating a prediction trajectory obtained by predicting a state quantity of the vehicle in time series at a plurality of prediction points so as to approach the target trajectory; and outputting a steering command for operating the vehicle according to the prediction trajectory.

The generating of the prediction trajectory includes: adjusting a plurality of prediction intervals to be wider as a distance from the vehicle increases.

The prediction intervals are defined as an interval between adjacent prediction points in a prediction section for generating the prediction trajectory.

The adjusting of the prediction intervals includes: adjusting the prediction intervals to be wider with a constant change rate as the distance from the vehicle increases.

According to the present embodiments, a non-transitory tangible computer readable storage medium includes instructions being executed by a processor to cause a vehicle to track a target trajectory in future travel of the vehicle.

The instructions includes:

generating a prediction trajectory obtained by predicting a state quantity of the vehicle in time series at a plurality of prediction points so as to approach the target trajectory; and outputting a steering command for operating the vehicle according to the prediction trajectory.

The generating of the prediction trajectory includes: adjusting a plurality of prediction intervals to be wider as a distance from the vehicle increases.

The prediction intervals are defined as an interval between adjacent prediction points in a prediction section for generating the prediction trajectory.

A numerical number of the plurality of prediction points is constant.

The processor is configured to further execute: adjusting the prediction section to be wider as an integrated value of a curvature change amount of the target trajectory in the predetermined section of the future travel of the vehicle.

Hereinafter, embodiments of the present disclosure will be described with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 2:
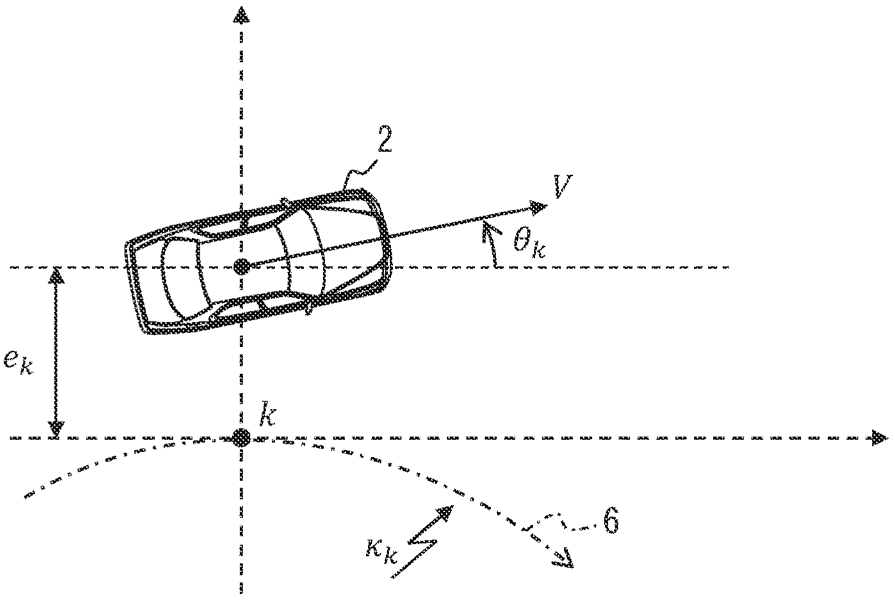
FIG. 2 is a schematic diagram showing the relationship between a target trajectory and a vehicle according to the first embodiment.

The trajectory processing system 1 of the first embodiment shown in FIG. 1 is a system for controlling the traveling of a vehicle 2 by tracking a target trajectory 6 in which target state quantities are specified in time series as shown in FIG. 2. The vehicle 2 is provided with an autonomous driving mode classified according to the degree of manual intervention of the driver in the driving task. The automated driving mode may be achieved with an autonomous driving control, such as conditional driving automation, advanced driving automation, or full driving automation, where the system in operation performs all driving tasks. The automatic driving mode may be achieved with an advanced driving assistance control, such as driving assistance or partial driving automation, where the occupant performs some or all driving tasks. The autonomous driving mode may be realized by either one or combination of automatic driving control and advanced driving assistance control or switching between the automatic control and advanced driving assistance control.

The vehicle 2 is equipped with the sensor system 4 and the target trajectory generation system 5 shown in FIG. 1. The sensor system 4 acquires sensor information that can be utilized by the trajectory processing system 1 and the target trajectory generation system 5 by detecting the external environment and the internal environment of the vehicle 2. Therefore, the sensor system 4 includes an external sensor 40 and an internal sensor 41 shown in FIG. 3.

The external sensor 40 acquires external environment information that can be utilized by the trajectory processing system 1 and the target trajectory generation system 5 from the external environment that is the peripheral environment of the vehicle 2. The external sensor 40 may acquire the external environment information by detecting an object disposed in the outside of the vehicle 2. The external sensor 40 of the object detection type is at least one of a camera, a LIDAR (i.e., Light Detection and Ranging/Laser Imaging Detection and Ranging), a radar, sonar, and the like, for example. The external sensor 40 may acquire external environment information by receiving positioning signals from artificial satellites of GNSS (i.e., Global Navigation Satellite System) disposed in the external environment of the vehicle 2. The positioning type external sensor 40 is, for example, a GNSS receiver or the like.

The internal sensor 41 acquires internal environment information that can be utilized by the trajectory processing system 1 and the target trajectory generation system 5 of the vehicle 2. The internal sensor 41 may acquire the internal environment information by detecting a specific state quantity in the internal environment of the vehicle 2. The physical quantity detection type internal sensor 41 is at least one of, for example, a vehicle speed sensor, an inertia sensor, and a steering angle sensor. The internal sensor 41 may acquire the internal environment information by detecting a specific state of a passenger in the internal environment of the vehicle 2. The passenger detection type internal sensor 41 is at least one of, for example, a driver status monitor (registered trademark), a biosensor, a seating sensor, an actuator sensor, an in-vehicle equipment sensor, and the like.

The target trajectory generation system 5 is connected to the sensor system 4 and the trajectory processing system 1 via at least one of LAN (i.e., Local Area Network) lines, wire harnesses, internal buses, wireless communication lines, and the like. The target trajectory generation system 5 includes at least one dedicated computer.

The dedicated computer that configures the target trajectory generation system 5 may be a driving control ECU (i.e., Electronic Control Unit) that controls the driving operation of the vehicle 2. The dedicated computer that configures the target trajectory generation system 5 may be a navigation ECU that navigates the travel route of the vehicle 2. The dedicated computer that configures the target trajectory generation system 5 may be a locator ECU that estimates the state quantity of the vehicle 2. The dedicated computer that configures the target trajectory generation system 5 may be an actuator ECU that controls travel actuators of the vehicle 2, such as the steering actuator 3 (see FIG. 3, which will be described later). The dedicated computer that configures the target trajectory generation system 5 may be an HCU (i.e., Human Machine Interface Control Unit, HMI Control Unit) that controls information presentation in the vehicle 2.

The target trajectory generation system 5 generates a target trajectory 6 that chronologically defines the target state quantity of the vehicle 2 in future travel based on the information acquired by the sensor system 4. At this time, the target trajectory generation system 5 generates the target trajectory 6 with the region from the current time-series point to the time-series point of the predetermined number of points ahead from the current time-series point as the future prediction region. Here, the travel trajectory 6 defines a vector value or a scalar value at each time series point in the future prediction region so as to give a desired response characteristic with respect to a specific state quantity of various state quantities of the vehicle 2. The state quantity of the vehicle 2 defined by the driving trajectory includes at least a relative lateral position with respect to the traveling road, a yaw angle, and vehicle speed information. The lateral position relative to the traveling path 4 is defined as the relative position from the center position in the width direction of the traveling road, and is simply referred to as the lateral position in the following description. The yaw angle relative to the traveling path is defined as the relative angle between the center line of the traveling road and the center line in the width direction of the vehicle 2, and is simply referred to as the yaw angle in the following description.

The trajectory processing system 1 is connected to the sensor system 4 and the target trajectory generation system 5 via at least one of LAN (i.e., Local Area Network) lines, wire harnesses, internal buses, wireless communication lines, and the like. The trajectory processing system 1 includes at least one dedicated computer.

The dedicated computer that configures the trajectory processing system 1 may be a driving control ECU (i.e., Electronic Control Unit) that controls the driving operation of the vehicle 2. The dedicated computer that configures the trajectory processing system 1 may be a navigation ECU that navigates the travel route of the vehicle 2. The dedicated computer that configures the trajectory processing system 1 may be a locator ECU that estimates the state quantity of the vehicle 2. The dedicated computer that configures the trajectory processing system 1 may be an actuator ECU that controls travel actuators of the vehicle 2, such as the steering actuator 3 (see FIG. 3, which will be described later). The dedicated computer that configures the trajectory processing system 1 may be an HCU (i.e., Human Machine Interface Control Unit, HMI Control Unit) that controls information presentation in the vehicle 2. The dedicated computer that configures the trajectory processing system 1 may be a computer other than the vehicle 2, which configures an external center or a mobile terminal that can communicate with the vehicle 2, for example.

Figure 4:
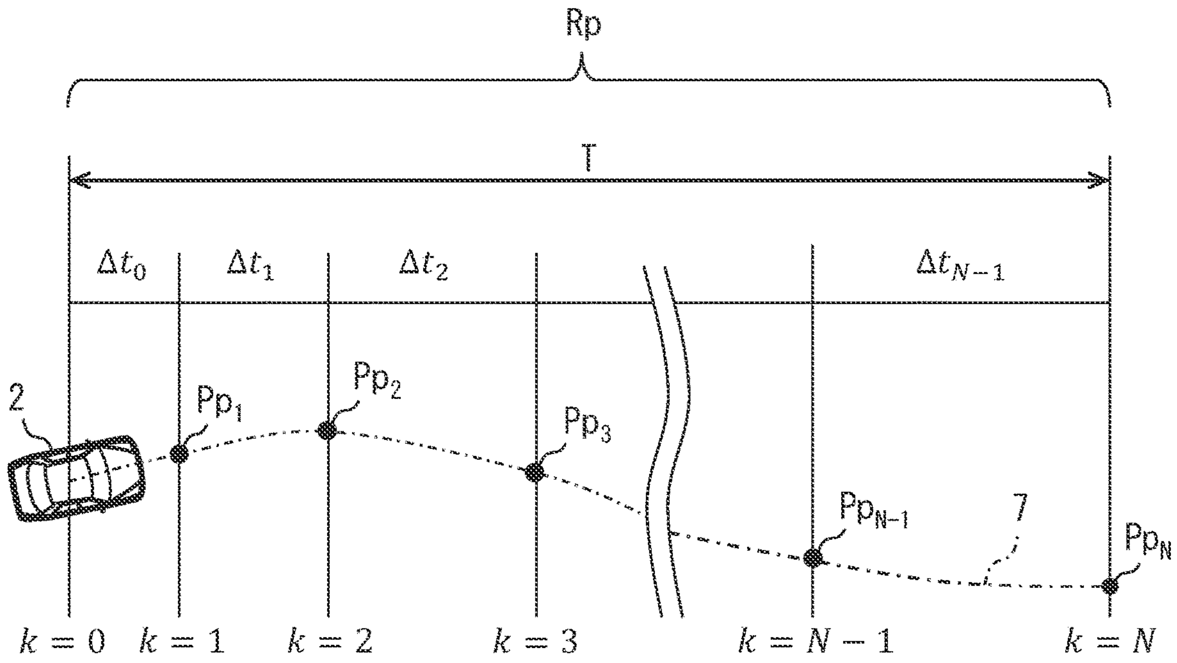
FIG. 4 is an explanatory diagram for explaining prediction intervals according to the first embodiment.

Based on the information acquired by the sensor system 4 and the target trajectory 6 generated by the target trajectory generation system 5, the trajectory processing system 1 generates a prediction trajectory 7 so as to optimize the followability to the target trajectory 6 in the prediction section Rp. At this time, the trajectory processing system 1 generates a prediction trajectory 7 for predicting the state quantity of the vehicle 2 in the prediction section Rp in the future travel in a time series manner at each control cycle (for example, 10 ms) that gives a steering command to the steering actuator 3. Here, the prediction trajectory 7 is generated with the region from the current time-series point to the time-series point with a predetermined number of points ahead from the current time-series point as the prediction section Rp. That is, it can be said that the time series points on the prediction trajectory 7 shown in FIG. 4 are the prediction points that give the prediction trajectory 7. When each time series point included in the prediction region Rp is identified by the chronological time with the index k, the current time series point at the present time is defined as k=0, and the time series point ahead of the current time-series point by the predetermined number of points is defined as k=N, the current time series point provides a starting point and the time series point provides an end point in the prediction trajectory.

The trajectory processing system 1 has at least one memory 10 and at least one processor 11. The memory 10 is at least one type of non-transitory tangible storage medium, such as a semiconductor memory, a magnetic medium, and an optical medium, for non-transitory storage of computer readable programs and data. The processor 11 includes at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), a GSP (i.e., Graph Streaming Processor), or the like as a core.

Figure 3:
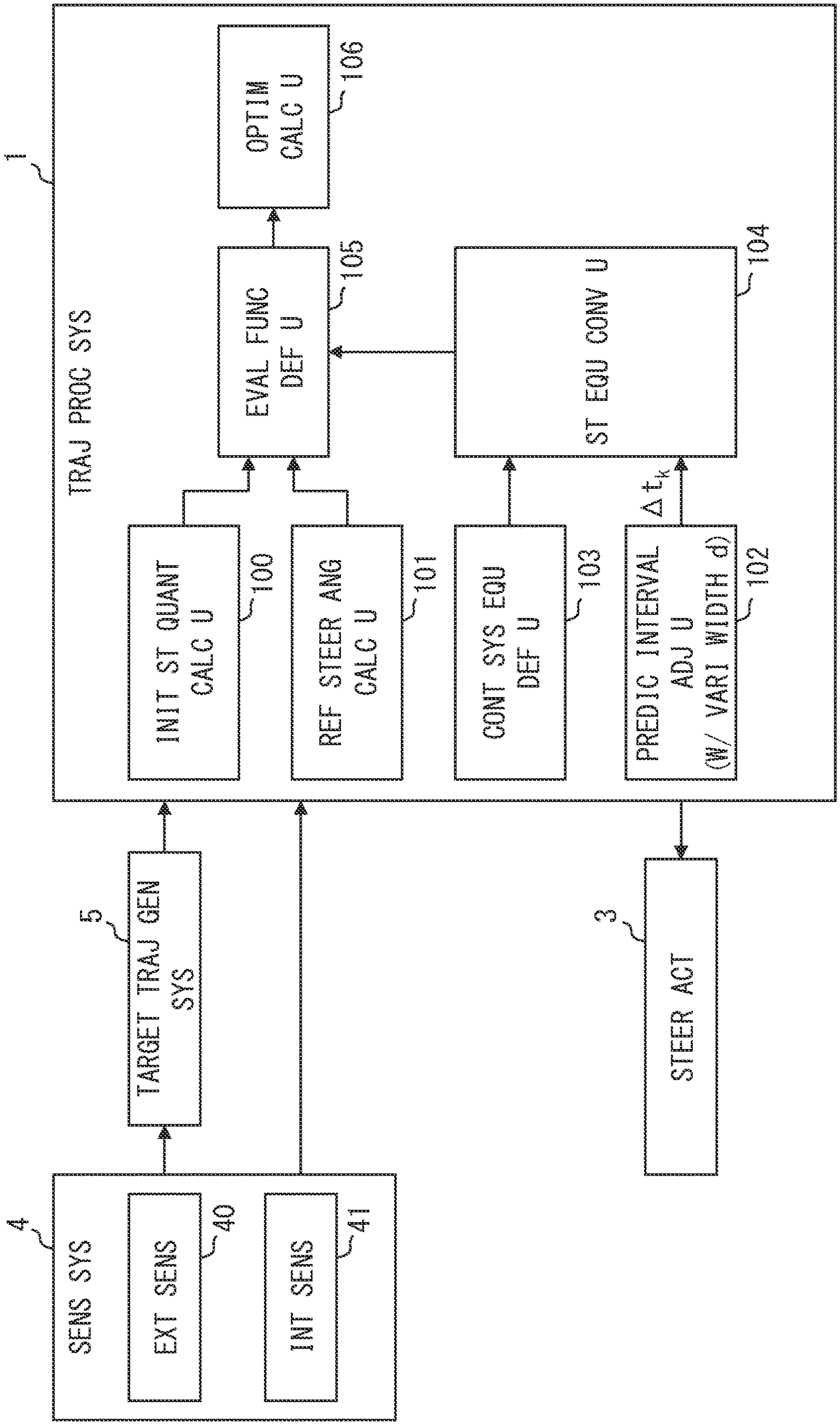
FIG. 3 is a block diagram illustrating a functional configuration of the trajectory processing system according to the first embodiment.

In the trajectory processing system 1, the processor 11 executes a plurality of instructions included in the trajectory processing program stored in the memory 10 to control the vehicle 2 to track the target trajectory 6. Thus, the trajectory processing system 1 establishes a plurality of functional units for controlling the traveling operation of the vehicle 2 to track the target trajectory 6. As shown in FIG. 3, the plurality of functional units established by the trajectory processing system 1 include an initial state quantity calculation unit 100, a reference steering angle calculation unit 101, a prediction interval adjustment unit 102, a continuous system equation definition unit 103, a state equation conversion unit 104, an evaluation function definition unit 105, and an optimization calculation unit 106.

The initial state quantity calculation unit 100 shown in FIG. 3 calculates an initial state quantity $x_0$ that satisfies Expression 1 as the state quantity of the vehicle 2 at the current time. In Expression 1, $e_0$ is the deviation (hereinafter referred to as lateral deviation) between the current lateral position of the vehicle 2 and the lateral position at the closest point on the target trajectory 6. In Expression 1, $\theta_0$ is the deviation (hereinafter referred to as yaw angle deviation) between the current yaw angle of the vehicle 2 and the yaw angle at the closest point on the target trajectory 6. In Expression 1, $\delta_0$ is the current steering angle of the vehicle 2. In Expression 1, $\beta_0$ is the sideslip angle of the vehicle 2 at the present time. In Expression 1, $\gamma_0$ is the yaw rate of the vehicle 2 at the present time. Here, the lateral deviation $e_0$ and the yaw angle deviation $\theta_0$ are obtained based on the vehicle position and the target trajectory 6 at the current time point k=0 shown in FIG. 2. On the other hand, the steering angle $\delta_0$, sideslip angle $\beta_0$, and yaw rate $\gamma_0$ are acquired by the sensor system 4.

$$x_0 = [e_0 \ \ \theta_0 \ \ \delta_0 \ \ \beta_0 \ \ \gamma_0]^T \qquad \text{[Expression 1]}$$

The reference steering angle calculation unit 101 shown in FIG. 3 calculates a reference steering angle according to the curvature $\kappa_k$ of the target trajectory 6 shown in FIG. 2 based on the two-wheel model. Here, the reference steering angle is the steering angle when the vehicle 2 travels on the target trajectory 6.

The prediction interval adjustment unit 102 adjusts the interval between the prediction points $Pp_k$ that are consecutively set at N points in the prediction section Rp for generating the prediction trajectory 7. The prediction section Rp adjusted by the prediction interval adjustment unit 102 in the first embodiment is an section with a preset constant time length T as shown in FIG. 4. The prediction interval adjustment unit 102 adjusts the prediction interval $\Delta t_k$ (here, $k<N$), which is the interval between the consecutive adjacent prediction points $Pp_k$, as an arithmetic progression with the first term $\Delta t_0$ and the tolerance d that satisfies Expression 2. Here, it can be said that the tolerance d is the time variation width of the prediction interval $\Delta t_k$. Also, the first term $\Delta t_0$ is set to the length of the control cycle. Therefore, the prediction interval adjustment unit 102 sets the tolerance d by setting the prediction point $Pp_N$ at the time k=N as the end of the prediction section Rp with the time length T. By setting the tolerance d in this manner, the prediction interval $\Delta t_k$, which is the interval between the prediction point $Pp_k$ at time k and the prediction point $Pp_{k+1}$ at time k+1, is determined according to Expression 3. As described above, the prediction interval $\Delta t_k$ is adjusted so as to widen with a constant variation width d as the distance from the vehicle 2 increases.

$$d = \frac{2(T - N\Delta t_0)}{N^2 - N} \qquad \text{[Expression 2]}$$

$$\Delta t_k = \Delta t_0 + kd \qquad \text{[Expression 3]}$$

The continuous system equation definition unit 103 shown in FIG. 3 defines the continuous system state equations in Expressions 4 and 5 based on the two-wheel model using the curvature information of the target trajectory 6 and the vehicle speed information. In Expression 4, X is the state quantity of vehicle 2 shown in Expression 6. In Expression 4, U is the steering angle as an input. In Expression 4, A, B, and W are parameter matrices shown in Expressions 8, 9, and 10, respectively. In Expression 5, Y is the lateral deviation e and the yaw angle deviation θ as outputs shown in Expression 7. In Expression 5, C is the parameter matrix shown in Expression 11. Note that e in Expressions 6 and 7 is the lateral deviation between the vehicle 2 and the target trajectory 6. In Expressions 6 and 7, θ is the yaw angle deviation between the vehicle 2 and the target trajectory 6. In Expression 6, δ is the steering angle of the vehicle 2. In Expression 6, β is the sideslip angle of the vehicle 2. In Expression 6, γ is the yaw rate of the vehicle. In Expression 8, $K_f$ and $K_r$ are cornering powers. In Expression 8, $l_f$ is the length from the center of gravity of the vehicle 2 to the front wheels. In Expression 8, $l_r$ is the length from the center of gravity of the vehicle 2 to the rear wheels. In Expression 8, m is the mass of the vehicle 2. In Expressions 8 and 10, V is the speed of the vehicle 2 (see FIG. 2). In Expression 9, τ is a time constant. In Expression 10, κ is the curvature of the target trajectory 6.

$$\frac{dX}{dt} = AX + BU + W \quad \text{[Expression 4]}$$

$$Y = CX \quad \text{[Expression 5]}$$

$$X = [e\ \theta\ \delta\ \beta\ \gamma]^T \quad \text{[Expression 6]}$$

$$Y = [e\ \theta]^T \quad \text{[Expression 7]}$$

$$A = \begin{bmatrix} 0 & V & 0 & 0 & 0 \\ 0 & 0 & \frac{2K_f}{mV} & -\frac{2(K_f + K_r)}{mV} & -\frac{2(l_fK_f - l_rK_r)}{I} \\ 0 & 0 & -\frac{1}{\tau} & 0 & 0 \\ 0 & 0 & \frac{2K_f}{mV} & -\frac{2(K_f + K_r)}{mV} & -\left(1 + \frac{2(l_fK_f - l_rK_r)}{mV^2}\right) \\ 0 & 0 & \frac{2l_fK_f}{I} & -\frac{2(l_fK_f - l_rK_r)}{I} & -\frac{2(l_f{}^2K_f + l_r{}^2K_r)}{IV} \end{bmatrix} \quad \text{[Expression 8]}$$

$$B = \left[0\ \ 0\ \ \frac{1}{\tau}\ \ 0\ \ 0\right]^T \quad \text{[Expression 9]}$$

$$W = [0\ \ -\kappa V\ \ 0\ \ 0\ \ 0]^T \quad \text{[Expression 10]}$$

$$C = \begin{bmatrix} 1 & 0 & 0 & 0 & 0 \\ 0 & 1 & 0 & 0 & 0 \end{bmatrix} \quad \text{[Expression 11]}$$

The state equation conversion unit 104 converts the continuous system state equation defined by the continuous system equation definition unit 103 into a discrete system state equation using the prediction interval $\Delta t_k$ adjusted by the prediction interval adjustment unit 102. Conversion of the continuous system state equation into the discrete system state equation can be performed by various methods such as forward difference approximation, backward difference approximation, zero-order hold, bilinear transformation, and the like. For example, when the forward difference approximation is used, the continuous system state equation is transformed into the discrete system state equation as shown in Expressions 12 and 13. In Expression 12, I is a unit matrix. In Expressions 12 and 13, the index k of each variable represents the time k of the prediction point $Pp_k$. The state quantity and the output of the continuous system state equation shown in Expressions 6 and 7 are represented by X and Y, respectively, while the state quantity and the output of the discrete system state equation shown in Expressions 12 and 13 are respectively represented by x and y.

$$x_{k+1} = (I + A_k\Delta t_k)x_k + B_k\Delta t_k u_k + W_k\Delta t_k \quad \text{[Expression 12]}$$

$$y_k = Cx_k \quad \text{[Expression 13]}$$

The evaluation function definition unit 105 defines the evaluation function J that satisfies Expression 14, based on the initial state quantity $x_0$ calculated by the initial state quantity calculation unit 100, the reference steering angle calculated by the reference steering angle calculation unit 101, and the discrete system state equation converted by the state equation conversion unit 104. Y in Expression 14 is the output column, indicating the output $y_k$ derived from the discrete state equation. In Expression 14, $Y_{ref}$ is zero because it is the lateral deviation and the yaw angle deviation of the target trajectory 6 with respect to the target trajectory 6. In Expression 14, U is an input column of the steering angles $u_k$ at each prediction point $Pp_k$. In Expression 14, $U_{ref}$ is the reference steering angle when the vehicle 2 travels on the target trajectory. Q in Expression 14 is a parameter matrix that weights the lateral deviation between the prediction trajectory 7 and the target trajectory 6. In Expression 14, R is a parameter matrix that weights the deviation between the steering angle U as the input value and the reference steering angle $U_{ref}$.

$$J = (Y - Y_{ref})^T Q (Y - Y_{ref}) + (U - U_{ref})^T R (U - U_{ref}) \quad \text{[Expression 14]}$$

The optimization calculation unit 106 calculates an input column U that optimizes (that is, minimizes in Expression 14) the evaluation function J defined by the evaluation function definition unit 105. The input column U for optimizing the evaluation function J can be calculated, for example, by the method of least squares. Since the prediction state quantity $x_k$ that defines the prediction trajectory 7 is determined according to the input column U, according to the input column U for optimizing the evaluation function J, the prediction trajectory 7 is generated so as to approach the target trajectory 6. Of the input column U calculated so as to optimize the evaluation function J in this way, the steering command representing the input $u_0$ at the current time point k=0 is given to the steering actuator 3. As a result, the steering state of the vehicle 2 is controlled so that the travel state of the vehicle 2 approaches the target trajectory 6.

Figure 5:
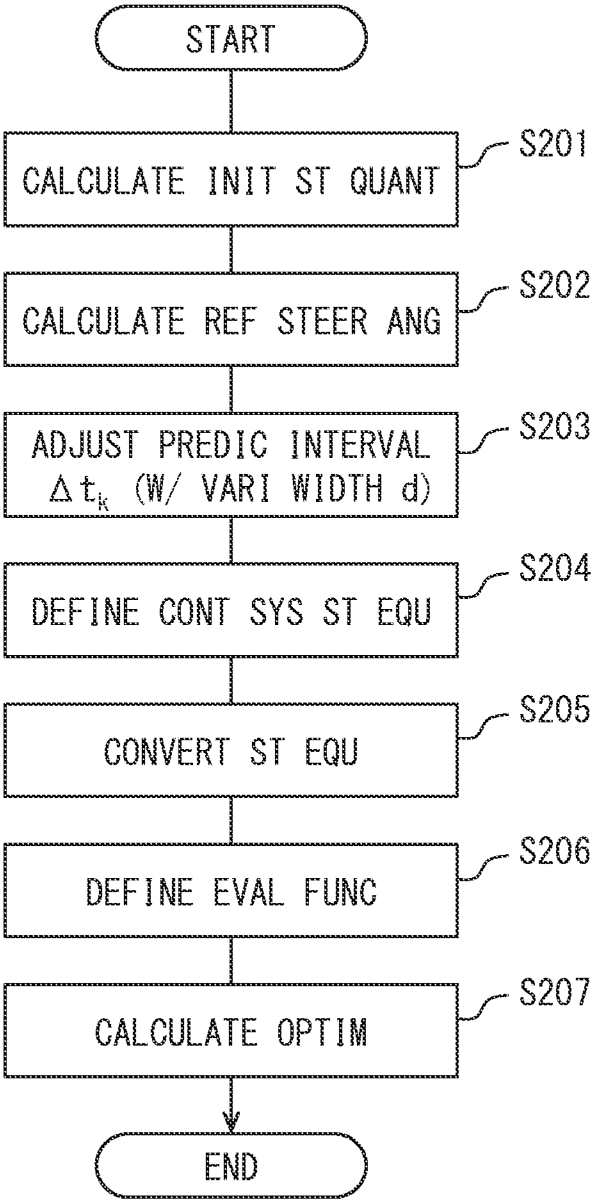
FIG. 5 is a flow chart showing a prediction trajectory generation flow according to the first embodiment.

The prediction trajectory generation flow realized by the trajectory processing system 1 will be described below with reference to the flowchart shown in FIG. 5. The prediction trajectory generation flow shown in FIG. 5 is started every control cycle.

In S201, the initial state quantity calculation unit 100 calculates the initial state quantity $x_0$, which is the state quantity of the vehicle 2 at the present time. In S202, the reference steering angle calculation unit 101 calculates a reference steering angle $U_{ref}$ corresponding to the curvature $k_k$ of the target trajectory 6. In S203, the prediction interval adjustment unit 102 adjusts the prediction interval $\Delta t_k$, which is the interval between consecutive prediction points $Pp_k$, so that the distance from the vehicle 2 increases with a constant variation width d.

In S204, the continuous system equation definition unit 103 defines a continuous system state equation based on the curvature information of the target trajectory 6 and the vehicle speed information. In S205, the state equation conversion unit 104 converts the continuous system state equation defined by the continuous system equation definition unit 103 in S204 into a discrete system state equation using the prediction interval $\Delta t_k$ adjusted by the prediction interval adjustment unit 102 in S203.

In S206, the evaluation function definition unit 105 defines the evaluation function J based on the initial state quantity $x_0$ calculated by the initial state quantity calculation unit 100 in S201, the reference steering angle $U_{ref}$ calculated by the reference steering angle calculation unit 101 in S202, and the discrete system state equation converted by the state equation conversion unit 104 in S205.

In S207, the optimization calculation unit 106 calculates an input column U that optimizes the evaluation function J defined by the evaluation function definition unit 105 in S206. Although this flow is completed as described above, the steering command representing the input $u_0$ at the current time point k=0 among the input column U calculated in S207 is given to the steering actuator 3, and the vehicle 2 is controlled under the track control to the target trajectory 6.

Operation Effects

The operation and effects of the first embodiment described above will be described below.

In the first embodiment, the prediction interval $\Delta t_k$ between consecutive prediction points $Pp_k$ that define the state quantity given to the vehicle 2 in generating the prediction trajectory 7 is adjusted so as to widen as the distance from the vehicle 2 increases. According to this, even if the prediction interval $\Delta t_k$ on the side closer to the vehicle 2 is narrowed in order to improve the trajectory tracking performance, the prediction interval $\Delta t_k$ on the side farther from the vehicle is widened, so that the total number of prediction points in the prediction section Rp can be suppressed from increasing. Therefore, it is possible to reduce the calculation load for generating the prediction trajectory 7 while suppressing reduction of the trajectory tracking performance.

In the first embodiment, the time interval between successive prediction points $Pp_k$ is adjusted as the prediction interval $\Delta t_k$. According to this, the time-based prediction interval $\Delta t_k$ can be accurately adjusted so as to increase with increasing the distance from the vehicle 2, thereby achieving both suppression of reduction in the trajectory tracking performance and reduction in calculation load.

In the first embodiment, the prediction interval $\Delta t_k$ is adjusted so that the distance from the vehicle 2 increases with a constant variation width d. According to this, it is possible to simplify the calculation of the prediction interval $\Delta t_k$ in particular, and reduce the calculation load.

Second Embodiment

A second embodiment is a modification of the first embodiment. In the second embodiment, the prediction interval adjustment unit 107 differs from the prediction interval adjustment unit 102 of the first embodiment.

Figure 6:
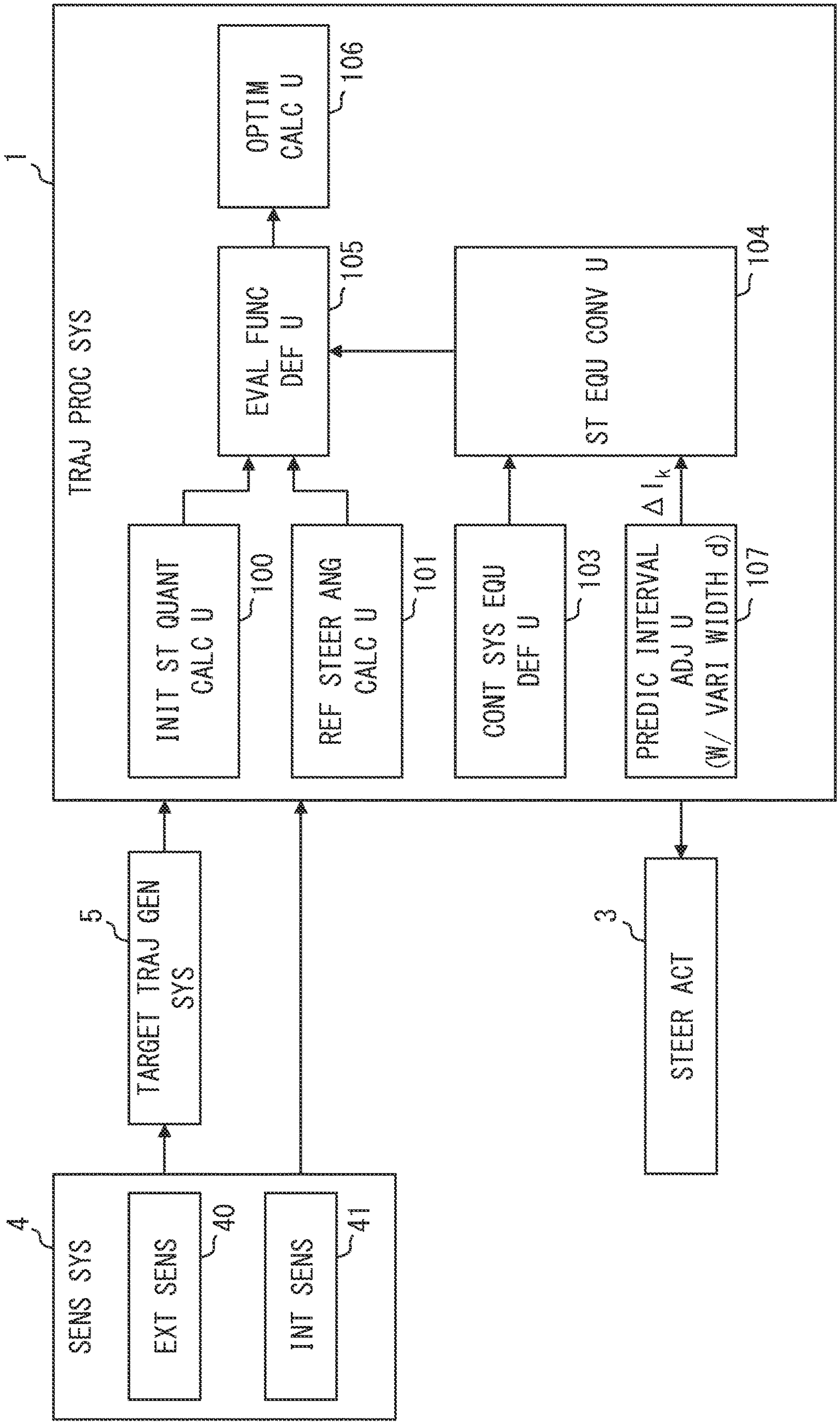
FIG. 6 is a block diagram illustrating a functional configuration of the trajectory processing system according to the second embodiment.
Figure 7:
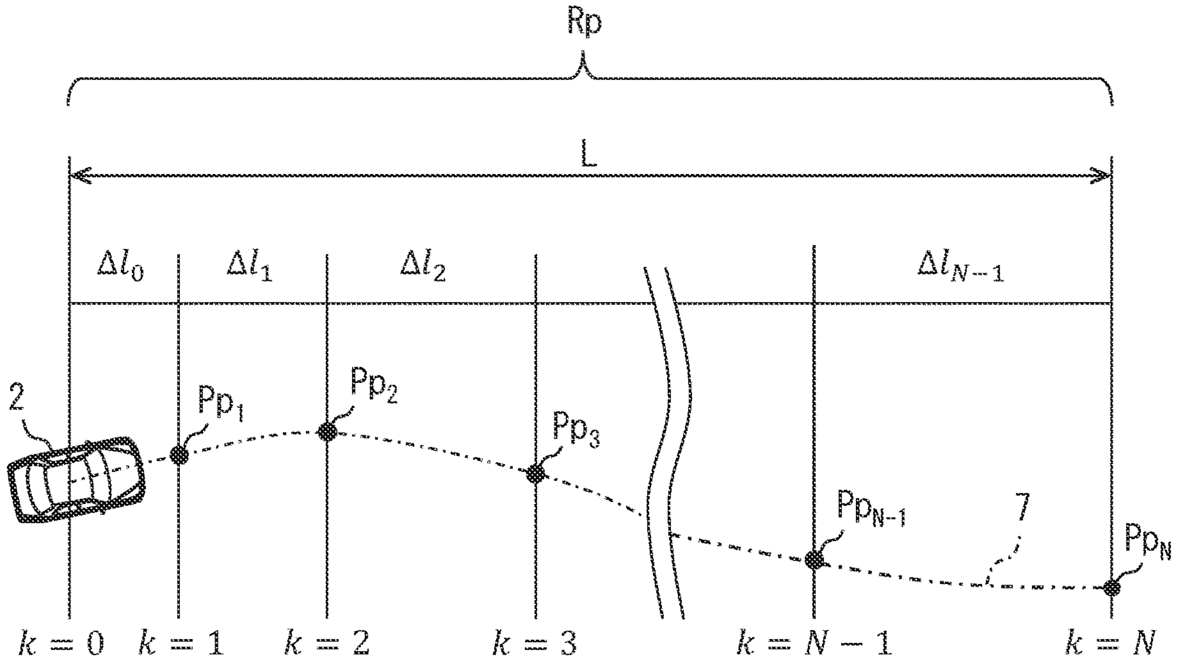
FIG. 7 is an explanatory diagram for explaining prediction intervals according to the second embodiment.

The prediction interval adjustment unit 107 of the second embodiment shown in FIG. 6 sets the prediction section Rp as a section with a preset distance L as shown in FIG. 7. The prediction interval adjustment unit 107 adjusts the prediction interval $\Delta l_k$ (here, k<N) between consecutive prediction points $Pp_k$ as an arithmetic progression with the first term $\Delta l_0$ and the tolerance d that satisfies Expression 15. Here, the first term $\Delta l_0$ is set to a distance obtained by multiplying the control cycle (for example, 10 ms) of the trajectory processing system 1 by the vehicle speed of the vehicle 2. It can be said that the tolerance d is the variation width in the distance of the prediction interval $\Delta l_k$. Therefore, the prediction interval adjustment unit 107 sets the tolerance d by setting the prediction point $Pp_N$ at the time k=N as the end of the prediction section Rp with the distance L. By setting the tolerance d in this manner, the prediction interval $\Delta l_k$, which is the interval between the prediction point $Pp_k$ at time k and the prediction point $Pp_{k+1}$ at time k+1, is determined according to Expression 16. As described above, the prediction interval $\Delta l_k$ is adjusted so as to widen with a constant variation width d as the distance from the vehicle 2 increases.

$$d = \frac{2(L - N\Delta l_0)}{N^2 - N} \quad \text{[Expression 15]}$$

$$\Delta l_k = \Delta l_0 + kd \quad \text{[Expression 16]}$$

After that, the prediction interval adjustment unit 107 divides the prediction interval $\Delta l_k$ as the distance interval by the vehicle speed to calculate the prediction interval $\Delta t_k$ as the time interval. As a result, the state equation conversion unit 104 can convert the continuous system state equation into the discrete system state equation, as in the first embodiment.

Figure 8:
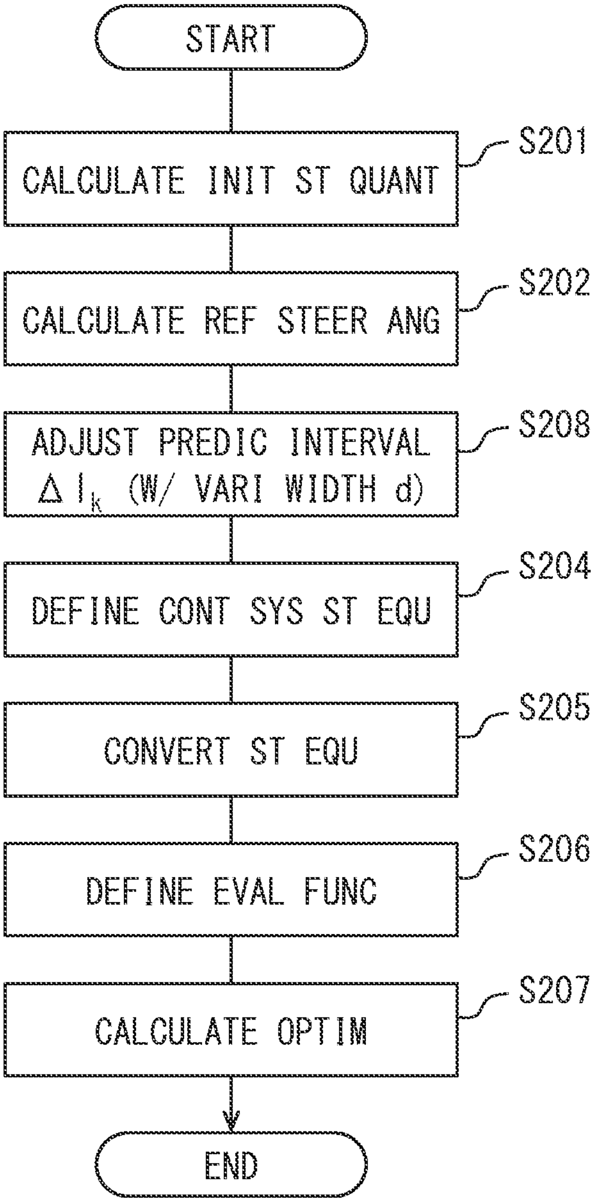
FIG. 8 is a flow chart showing a prediction trajectory generation flow according to the second embodiment.

A prediction trajectory generation flow by the trajectory processing system 1 of the second embodiment will be described below with reference to the flowchart of FIG. 8. This prediction trajectory generation flow is started every control cycle.

In S208 instead of S203 in the prediction trajectory generation flow of the second embodiment, the prediction interval adjustment unit 107 adjusts the prediction interval $\Delta l_k$, which is the interval between consecutive prediction points $Pp_k$, with a constant variation width d as the distance from the vehicle 2 increases. Then, the prediction interval adjustment unit 107 divides the prediction interval $\Delta l_k$ as the distance interval by the vehicle speed to calculate the prediction interval $\Delta t_k$ as the time interval.

In the second embodiment described above, the distance interval between successive prediction points $Pp_k$ is adjusted as the prediction interval $\Delta l_k$. According to this, the distance-based prediction interval $\Delta l_k$ can be accurately adjusted so as to increase with increasing the distance from the vehicle 2, thereby achieving both suppression of reduction in the trajectory tracking performance and reduction in calculation load.

Third Embodiment

The third embodiment is a modification of the first embodiment. In the third embodiment, the prediction interval adjustment unit 108 differs from the prediction interval adjustment unit 102 of the first embodiment.

Figure 9:
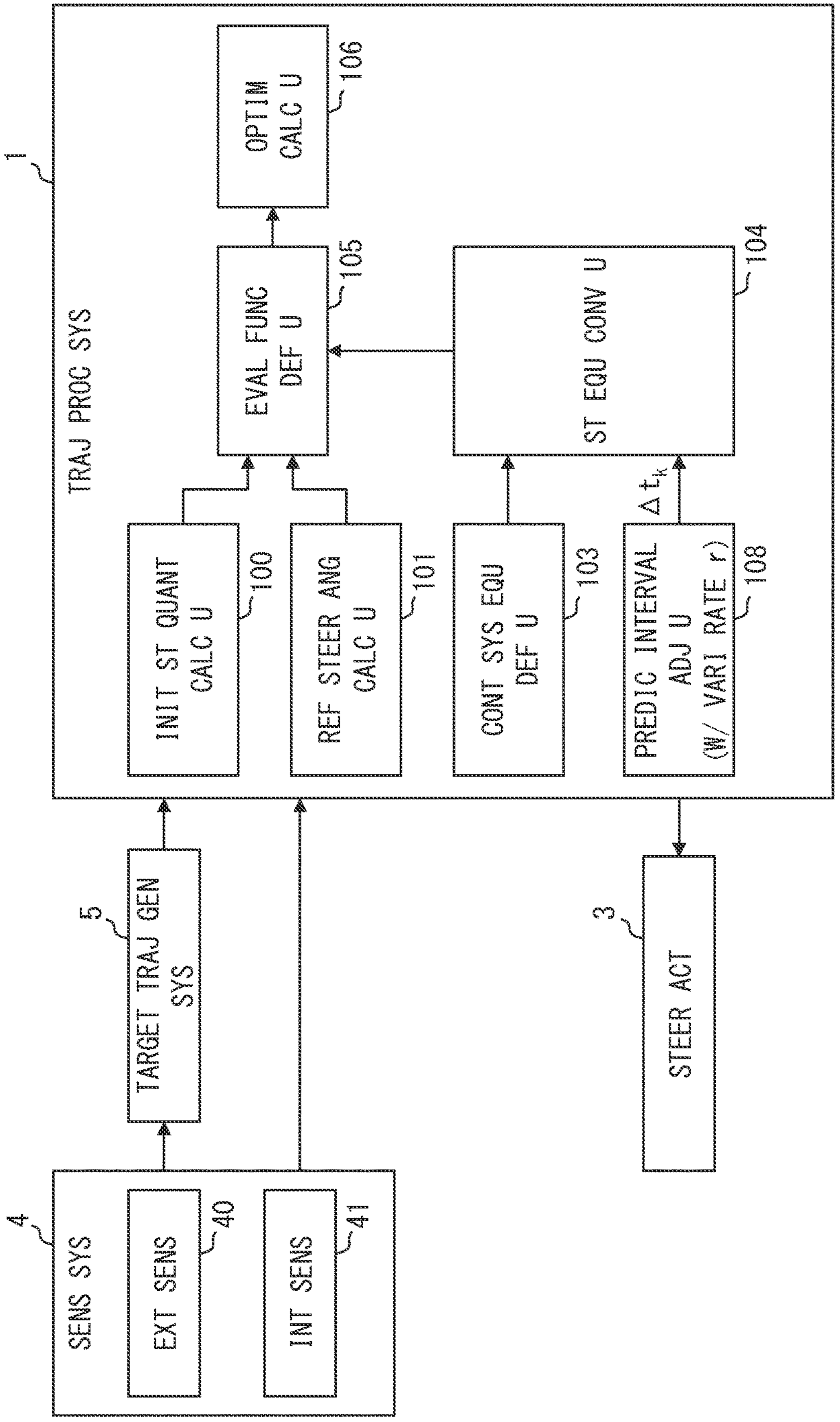
FIG. 9 is a block diagram illustrating a functional configuration of the trajectory processing system according to the third embodiment.

The prediction interval adjustment unit 108 of the third embodiment shown in FIG. 9 adjusts the prediction interval $\Delta t_k$ between consecutive prediction points $Pp_k$ as a geometric progression with the first term to and the common ratio r. It can be said that the common ratio r is the rate of variation of the prediction interval $\Delta t_k$. Also, the first term $\Delta t_0$ is set to the length of the control cycle. Therefore, the prediction interval adjustment unit 108 sets the common ratio r so as to satisfy Expression 17 by setting the prediction point $Pp_N$ at the time k=N to be the end of the prediction section Rp with the time length T. By setting the common ratio r in this manner, the prediction interval $\Delta t_k$, which is the time interval between the prediction point $Pp_k$ at time k and the prediction point $Pp_{k+1}$ at time k+1, is determined according to Expression 18. As described above, the prediction interval $\Delta t_k$ is adjusted so as to widen with a constant variation ratio r as the distance from the vehicle 2 increases.

$$\Delta t_0 = \frac{T(r-1)}{r^N - 1} \quad \text{[Expression 17]}$$

$$\Delta t_k = \Delta t_0 r^k \quad \text{[Expression 18]}$$

Figure 10:
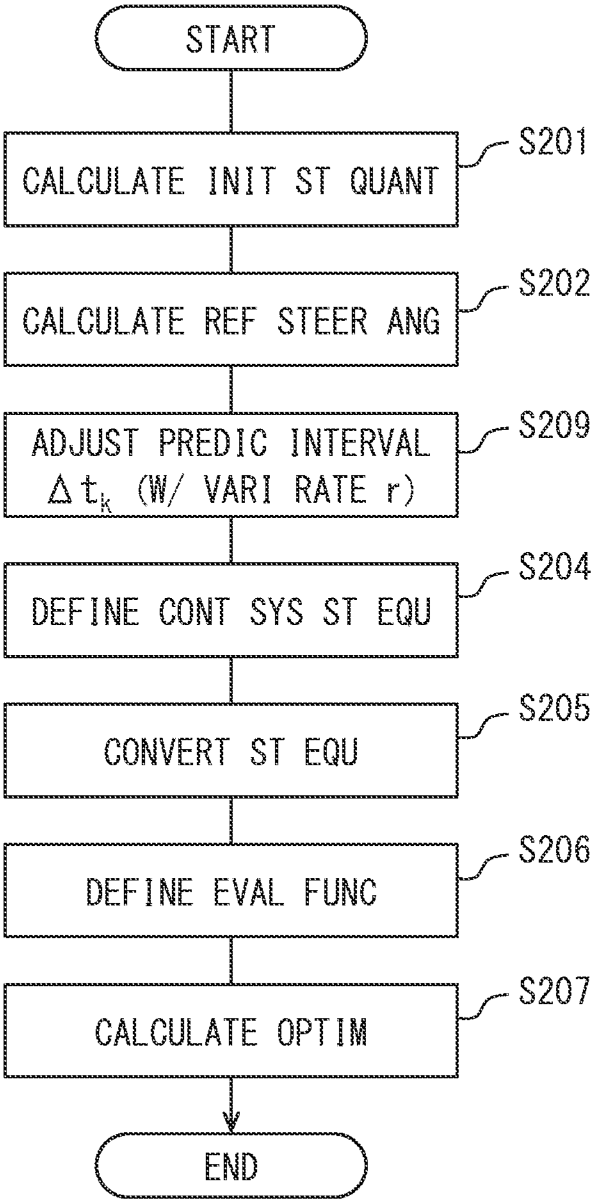
FIG. 10 is a flow chart showing a prediction trajectory generation flow according to the third embodiment.

A prediction trajectory generation flow by the trajectory processing system 1 of the third embodiment will be described below with reference to the flowchart of FIG. 10. This prediction trajectory generation flow is started every control cycle.

In S209 instead of S203 in the prediction trajectory generation flow of the third embodiment, the prediction interval adjustment unit 108 adjusts the prediction interval $\Delta t_k$, which is the interval between consecutive prediction points $Pp_k$, with a constant variation ratio r as the distance from the vehicle 2 increases.

In the third embodiment described above, the prediction interval $\Delta t_k$ is adjusted so as to widen with a constant variation rate r as the distance from the vehicle 2 increases. According to this, it is possible to remarkably change from a narrow prediction interval $\Delta t_k$ on the side closer to the vehicle 2 to a wide prediction interval $\Delta t_k$ on the side away from the vehicle 2, thereby it is possible to promote the compatibility with the suppression in reduction of the trajectory tracking performance and reduction of the calculation load.

Fourth Embodiment

A fourth embodiment is a modification of the second embodiment. In the fourth embodiment, the prediction interval adjustment unit 109 differs from the prediction interval adjustment unit 107 of the second embodiment.

Figure 11:
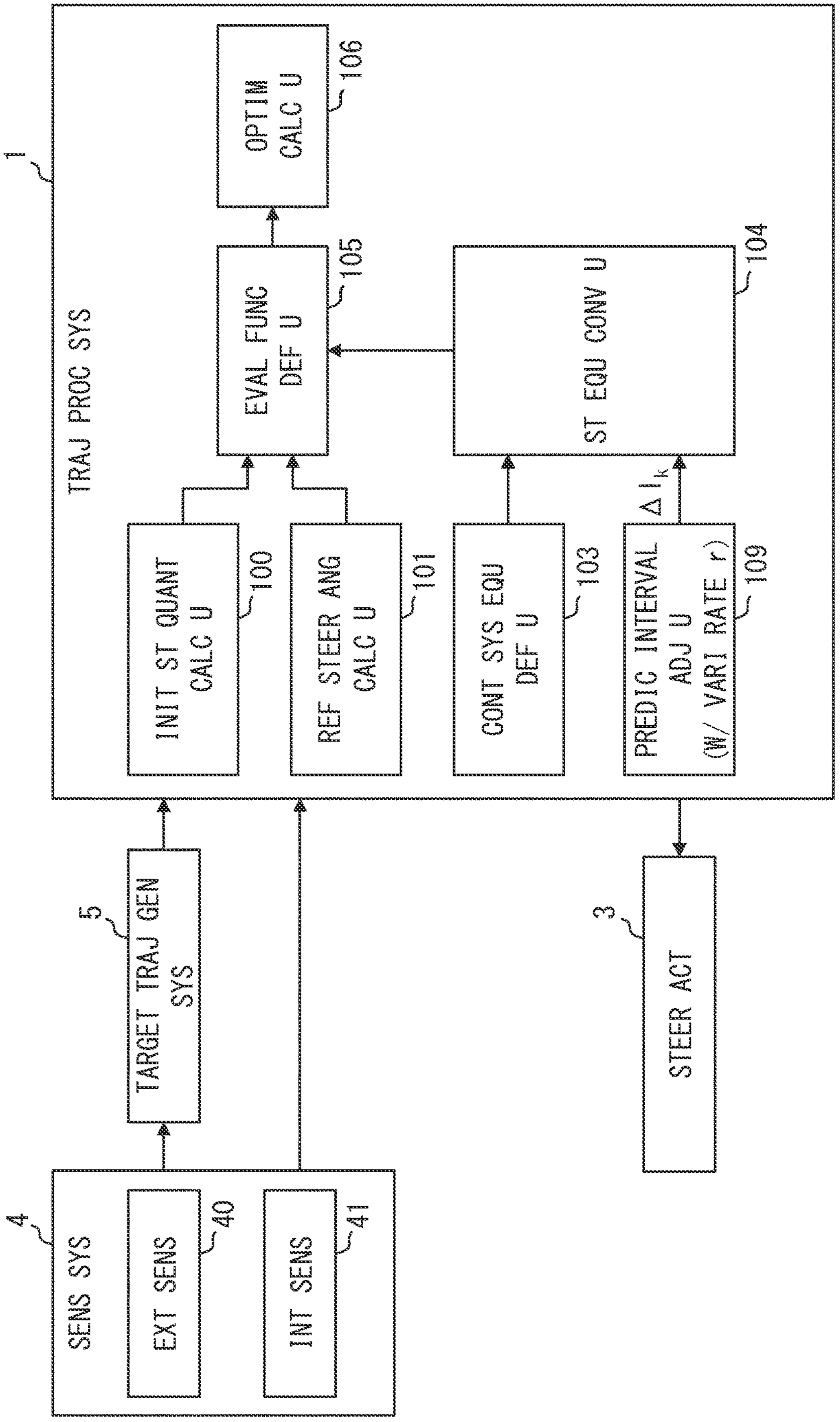
FIG. 11 is a block diagram illustrating a functional configuration of the trajectory processing system according to the fourth embodiment.

The prediction interval adjustment unit 109 of the fourth embodiment shown in FIG. 11 adjusts the prediction interval $\Delta l_k$ between consecutive prediction points $Pp_k$ as a geometric progression with the first term $\Delta l_0$ and the common ratio r. Here, the first term $\Delta l_0$ is set to a distance obtained by multiplying the control cycle (for example, 10 ms) of the trajectory processing system 1 by the vehicle speed of the vehicle 2. It can be said that the common ratio r is the rate of variation of the prediction interval $\Delta l_k$. Therefore, the prediction interval adjustment unit 109 sets the common ratio r so as to satisfy Expression 19 by setting the prediction point $Pp_N$ at the time k=N to be the end of the prediction section Rp with the distance L. By setting the common ratio r in this manner, the prediction interval $\Delta t_k$, which is the distance interval between the prediction point $Pp_k$ at time k and the prediction point $Pp_{k+1}$ at time k+1, is determined according to Expression 20. As described above, the prediction interval $\Delta l_k$ is adjusted so as to widen with a constant variation ratio r as the distance from the vehicle 2 increases.

$$\Delta l_0 = \frac{L(r-1)}{r^N - 1} \quad \text{[Expression 19]}$$

$$\Delta l_k = \Delta l_0 r^k \quad \text{[Expression 20]}$$

After that, the prediction interval adjustment unit 109 divides the prediction interval $\Delta l_k$ as the distance interval by the vehicle speed to calculate the prediction interval $\Delta t_k$ as the time interval. As a result, the state equation conversion unit 104 can convert the continuous system state equation into the discrete system state equation, as in the first embodiment.

Figure 12:
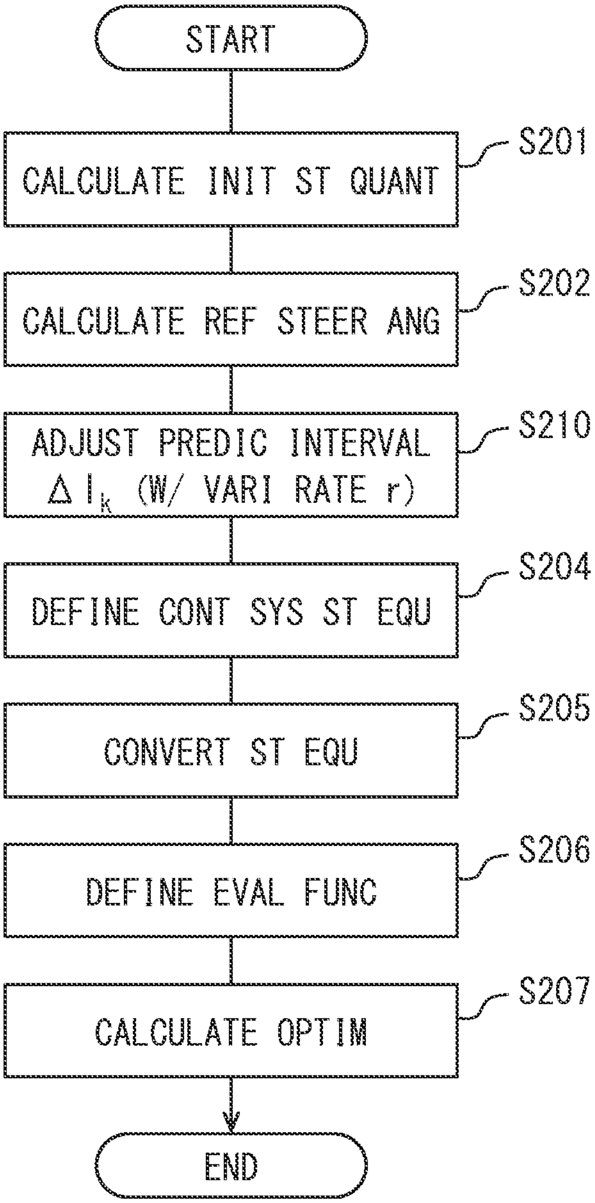
FIG. 12 is a flow chart showing a prediction trajectory generation flow according to the fourth embodiment.

A prediction trajectory generation flow by the trajectory processing system 1 of the fourth embodiment will be described below with reference to the flowchart of FIG. 12. This prediction trajectory generation flow is started every control cycle.

In S210 instead of S208 in the prediction trajectory generation flow of the fourth embodiment, the prediction interval adjustment unit 109 adjusts the prediction interval $\Delta l_k$, which is the interval between consecutive prediction points $Pp_k$, with a constant variation ratio r as the distance from the vehicle 2 increases. Then, the prediction interval adjustment unit 109 divides the prediction interval $\Delta l_k$ as the distance interval by the vehicle speed to calculate the prediction interval $\Delta t_k$ as the time interval.

In the fourth embodiment described above, the prediction interval $\Delta l_k$ is adjusted so as to widen with a constant variation rate r as the distance from the vehicle 2 increases. According to this, it is possible to remarkably change from a narrow prediction interval $\Delta l_k$ on the side closer to the vehicle 2 to a wide prediction interval $\Delta l_k$ on the side away from the vehicle 2, thereby it is possible to promote the compatibility with the suppression in reduction of the trajectory tracking performance and reduction of the calculation load.

Fifth Embodiment

A fifth embodiment is a modification of the first embodiment. In the fifth embodiment, the configuration of the trajectory processing system 1 is different from that in the first embodiment.

Figure 13:
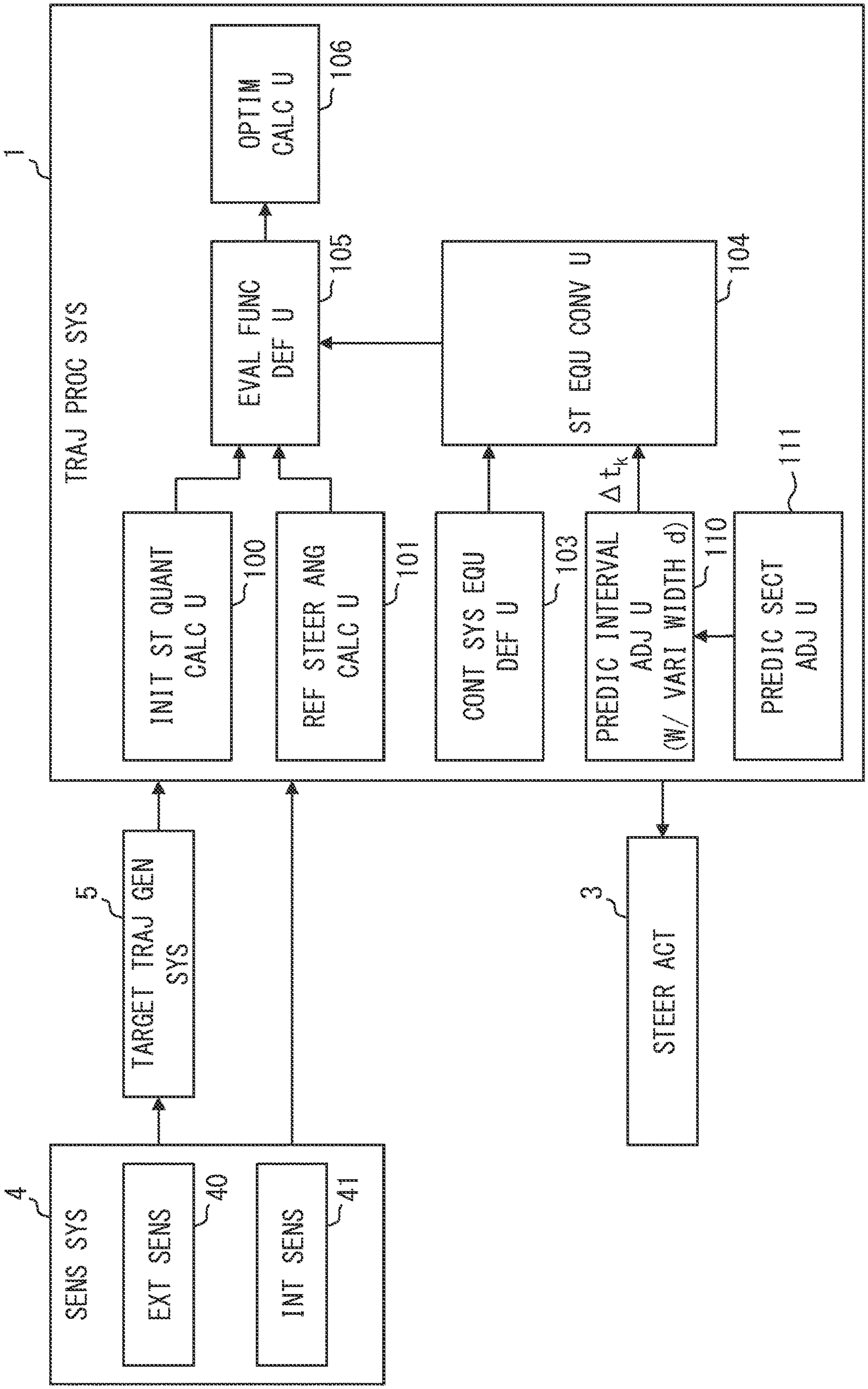
FIG. 13 is a block diagram illustrating a functional configuration of the trajectory processing system according to the fifth embodiment.

The trajectory processing system 1 of the fifth embodiment has a prediction section adjustment unit 111 as shown in FIG. 13. The prediction section adjustment unit 111 calculates the integrated value of the variation amount in the curvature ρ of the target trajectory 6 in a predetermined section from the vehicle 2 and narrower than the future section for generating the target trajectory. Specifically, the prediction section adjustment unit 111 calculates the curvature change amount as the absolute value of the difference between the curvature $\rho_k$ at the time series point k and the curvature $\rho_{k-1}$ at the time series point k−1, and calculates the integrated value of the change amount of the curvature from the time series point K=1 to the time series point K=N. Therefore, the prediction section adjustment unit 111 adjusts the length T of the prediction section Rp so as to satisfy Expression 21, that is, so that the larger the integrated value of the curvature change amount, the wider the prediction section Rp. In response to this, the prediction section adjustment unit 110 of the fifth embodiment adjusts the prediction interval $\Delta t_k$ similar to the first embodiment based on the length T of the prediction section Rp adjusted by the prediction section adjustment unit 111.

$$\sum_{k=1}^{N} |\rho_k - \rho_{k-1}| \to T \quad \text{[Expression 21]}$$

Figure 14:
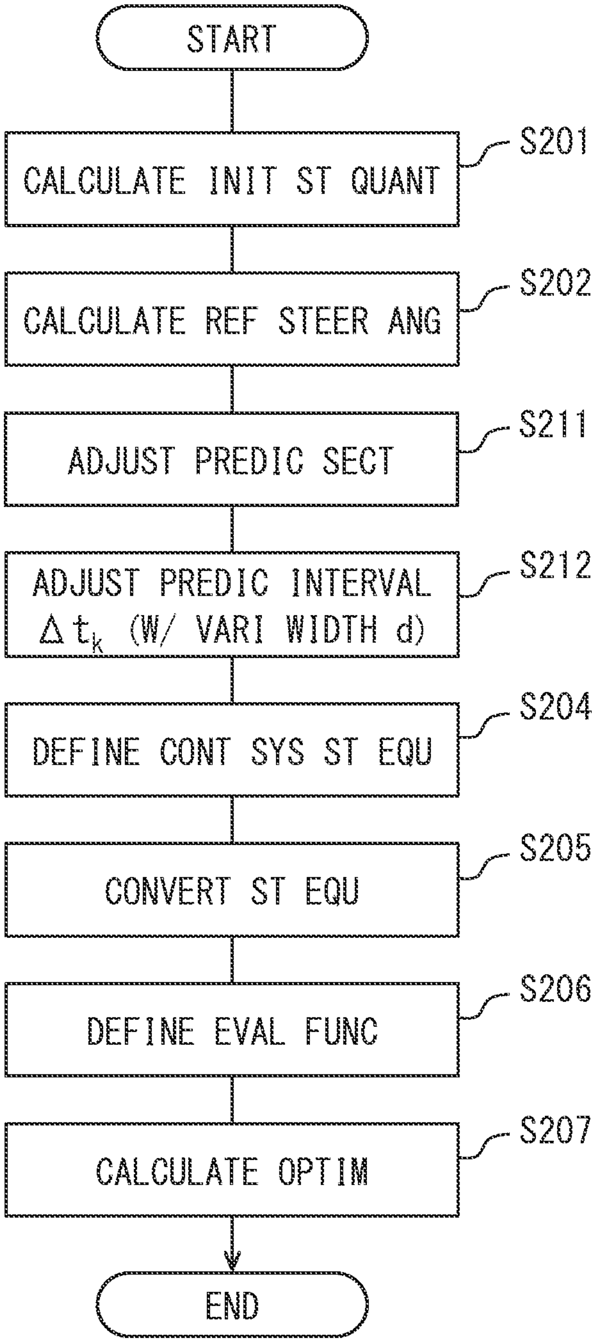
FIG. 14 is a flow chart showing a prediction trajectory generation flow according to the fifth embodiment.

A prediction trajectory generation flow by the trajectory processing system 1 of the fifth embodiment will be described below with reference to the flowchart of FIG. 14. This prediction trajectory generation flow is started every control cycle.

$$\sum_{k=1}^{N} |\rho_k - \rho_{k-1}| \to T$$

In S211 instead of S203 in the predicted trajectory generation flow of the fifth embodiment, the prediction section adjustment unit 111 adjusts the time length T of the prediction section Rp so that the larger the integrated value of the curvature change amount of the target trajectory 6 in the set section, the wider the prediction section Rp. Therefore, in S212 instead of S203 in the prediction trajectory generation flow of the fifth embodiment, the prediction section adjustment unit 110 adjusts the prediction interval $\Delta t_k$ based on the length T of the prediction section Rp adjusted by the prediction section adjustment unit 111 in S208.

In the fifth embodiment described above, the prediction section Rp is adjusted such that the larger the integrated value of the curvature change amount of the target trajectory 6 in the set section, the wider the prediction section Rp. According to this, while the vehicle 2 is traveling on a road with a large curvature change amount, it is possible to generate the predicted trajectory 7 considering the curvature change amount of a road farther from the vehicle. Therefore, it is possible to control the vehicle to respond as quickly as possible to changes in the curvature of the road ahead the vehicle.

Sixth Embodiment

A sixth embodiment is a modification of the second embodiment. In the sixth embodiment, the configuration of the trajectory processing system 1 is different from that in the second embodiment.

Figure 15:
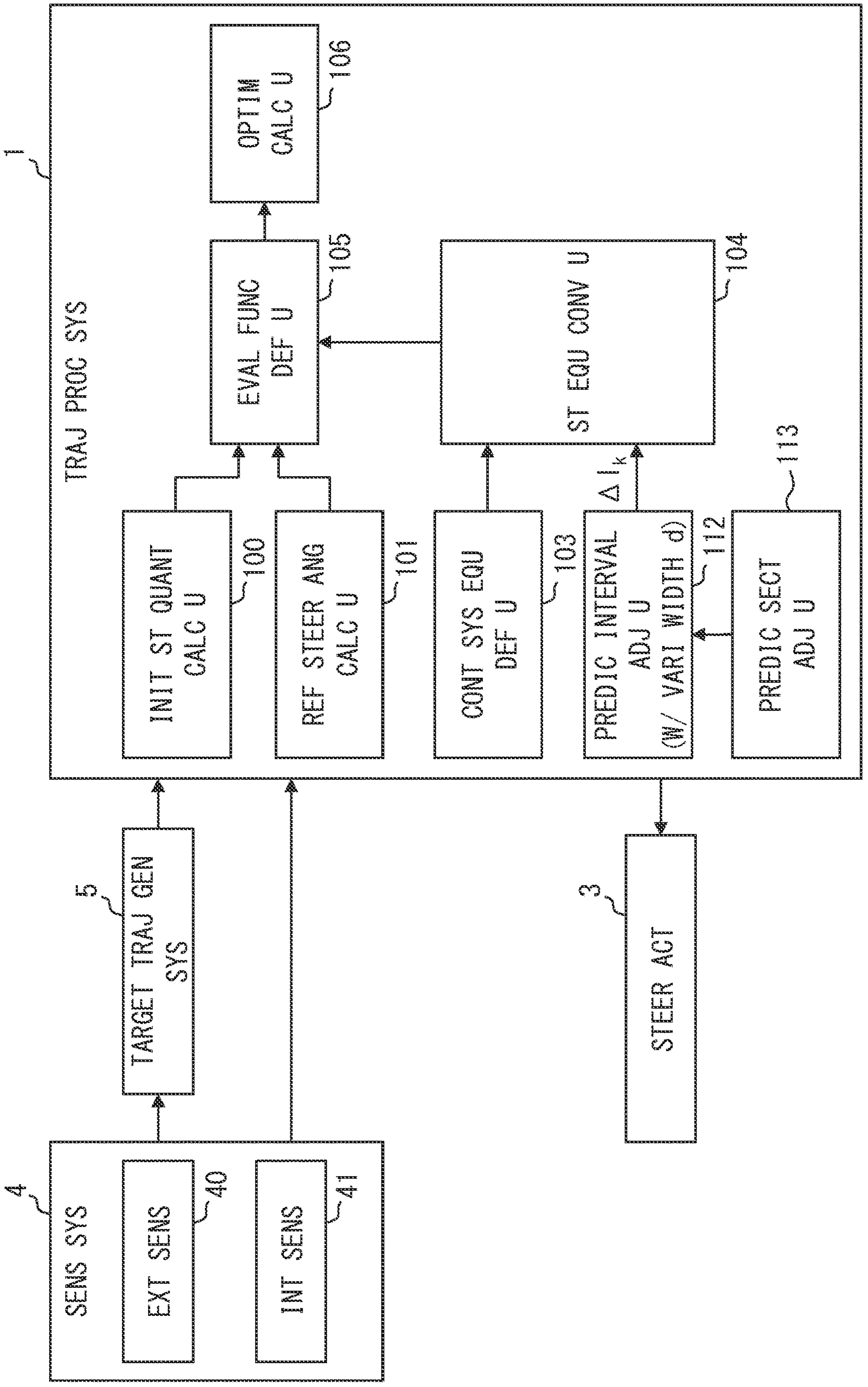
FIG. 15 is a block diagram illustrating a functional configuration of the trajectory processing system according to the sixth embodiment.

The trajectory processing system 1 of the sixth embodiment has a prediction section adjustment unit 113 as shown in FIG. 15. The prediction section adjustment unit 113 calculates the integrated value of the variation amount in the curvature p of the target trajectory 6 in a predetermined section from the vehicle 2 and narrower than the future section for generating the target trajectory. Specifically, the prediction section adjustment unit 113 calculates the curvature change amount as the absolute value of the difference between the curvature $\rho_k$ at the time series point k and the curvature $\rho_{k-1}$ at the time series point k−1, and calculates the integrated value of the change amount of the curvature from the time series point K=1 to the time series point K=N. Therefore, the prediction section adjustment unit 113 adjusts the length L of the prediction section Rp so as to satisfy Expression 22, that is, so that the larger the integrated value of the curvature change amount, the wider the prediction section Rp. In response to this, the prediction section adjustment unit 112 of the sixth embodiment adjusts the prediction interval $\Delta l_k$ similar to the second embodiment based on the length T of the prediction section Rp adjusted by the prediction section adjustment unit 113.

$$\sum\nolimits_{k=1}^{N} |\rho_k - \rho_{k-1}| \to L \quad \text{[Expression 22]}$$

After that, the prediction interval adjustment unit 112 divides the prediction interval $\Delta l_k$ as the distance interval by the vehicle speed to calculate the prediction interval $\Delta t_k$ as the time interval. As a result, the state equation conversion unit 104 can convert the continuous system state equation into the discrete system state equation, as in the first embodiment.

$$\sum_{k=1}^{N} |\rho_k - \rho_{k-1}| \to L$$

Figure 16:
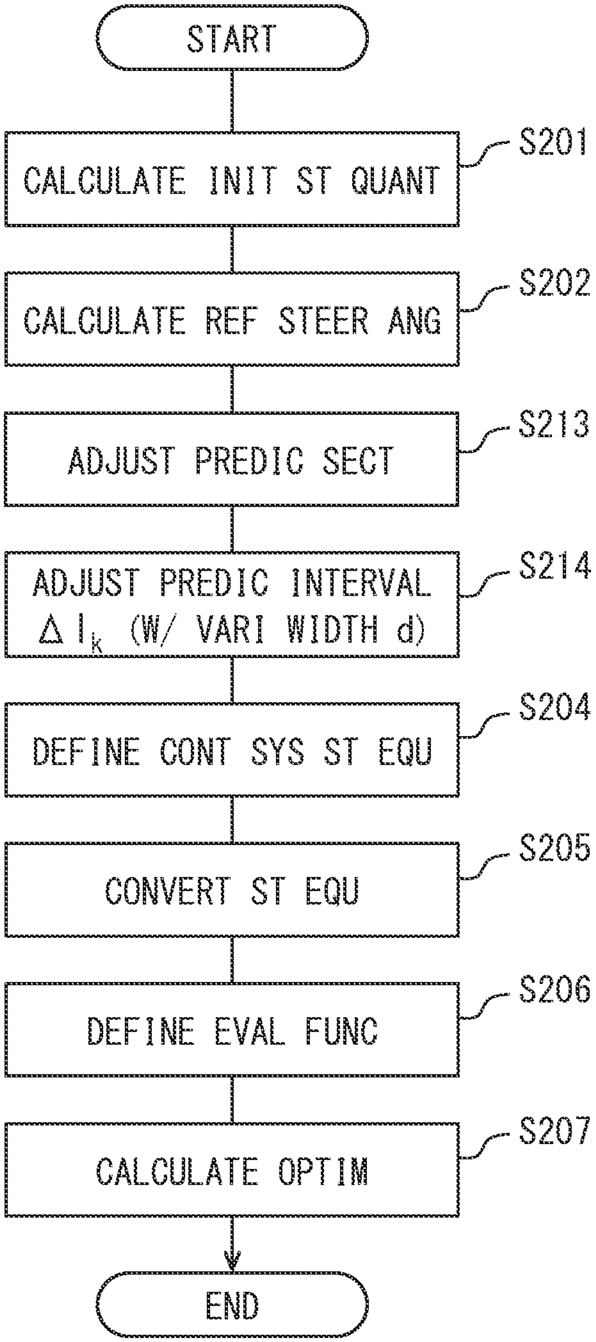
FIG. 16 is a flow chart showing a prediction trajectory generation flow according to the sixth embodiment.

A prediction trajectory generation flow by the trajectory processing system 1 of the sixth embodiment will be described below with reference to the flowchart of FIG. 16. This prediction trajectory generation flow is started every control cycle.

In S213 instead of S208 in the predicted trajectory generation flow of the sixth embodiment, the prediction section adjustment unit 113 adjusts the length L of the prediction section Rp so that the larger the integrated value of the curvature change amount of the target trajectory 6 in the set section, the wider the prediction section Rp. Therefore, in S214 instead of S208 in the prediction trajectory generation flow of the sixth embodiment, the prediction section adjustment unit 112 adjusts the prediction interval $\Delta l_k$ based on the length L of the prediction section Rp adjusted by the prediction section adjustment unit 113 in S213. Then, the prediction interval adjustment unit 112 divides the prediction interval $\Delta l_k$ as the distance interval by the vehicle speed to calculate the prediction interval $\Delta t_k$ as the time interval.

In the sixth embodiment described above, the prediction section Rp is adjusted such that the larger the integrated value of the curvature change amount of the target trajectory 6 in the set section, the wider the prediction section Rp. According to this, while the vehicle 2 is traveling on a road with a large curvature change amount, it is possible to generate the predicted trajectory 7 considering the curvature change amount of a road farther from the vehicle. Therefore, it is possible to control the vehicle to respond as quickly as possible to changes in the curvature of the road ahead the vehicle.

Other Embodiments

Although a plurality of embodiments of the present disclosure have been described above, the present disclosure is not construed as being limited to these embodiments, and can be applied to various embodiments and combinations within a scope without departing from the spirit of the present disclosure.

The dedicated computer of the trajectory processing system 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In a modification, the fifth embodiment may be implemented in combination with the third embodiment. In a modification, the sixth embodiment may be implemented in combination with the second or fourth embodiments.

In addition to the above-described embodiments, the trajectory processing system 1 according to the above-described embodiments and modifications may be implemented as a trajectory processing device (for example, a trajectory processing ECU, and the like) mounted entirely on the vehicle 2. The above-described embodiment and the modification example may be realized as a semiconductor device (e.g. semiconductor chip) that has at least one processor 11 and at least one memory 10 of the trajectory processing system 1.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S201. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A trajectory processing system for performing a trajectory processing for causing a vehicle to track a target trajectory in future travel of the vehicle, the trajectory processing system comprising: a processor, wherein:

the processor is configured to execute:

generating a prediction trajectory obtained by predicting a state quantity of the vehicle in time series at a plurality of prediction points so as to approach the target trajectory; and outputting a steering command for operating the vehicle according to the prediction trajectory;

the generating of the prediction trajectory includes: adjusting a plurality of prediction intervals to be wider as a distance from the vehicle increases;

the prediction intervals are defined as an interval between adjacent prediction points in a prediction section for generating the prediction trajectory; and the adjusting of the prediction intervals includes:

adjusting a distance interval between adjacent prediction points as a respective prediction interval; and adjusting the prediction intervals to be wider with a constant change width as the distance from the vehicle increases.

2. The trajectory processing system according to claim 1, wherein the adjusting of the prediction intervals includes: adjusting the prediction intervals as an arithmetic progression with a predetermined first term and a predetermined tolerance.

3. A trajectory processing device for performing a trajectory processing for causing a vehicle, to which the trajectory process device is mounted, to track a target trajectory in future travel of the vehicle, the trajectory processing device comprising: a processor, wherein:

the processor is configured to further execute:

generating a prediction trajectory obtained by predicting a state quantity of the vehicle in time series at a plurality of prediction points so as to approach the target trajectory; and outputting a steering command for operating the vehicle according to the prediction trajectory;

the generating of the prediction trajectory includes: adjusting a plurality of prediction intervals to be wider as a distance from the vehicle increases;

the prediction intervals are defined as an interval between adjacent prediction points in a prediction section for generating the prediction trajectory; and the adjusting of the prediction intervals includes:

adjusting a distance interval between adjacent prediction points as a respective prediction interval; and adjusting the prediction intervals to be wider with a constant change width as the distance from the vehicle increases.

4. A trajectory processing method executed by a processor for causing a vehicle to track a target trajectory in future travel of the vehicle, comprising:

generating a prediction trajectory obtained by predicting a state quantity of the vehicle in time series at a plurality of prediction points so as to approach the target trajectory; and outputting a steering command for operating the vehicle according to the prediction trajectory, wherein:

the generating of the prediction trajectory includes: adjusting a plurality of prediction intervals to be wider as a distance from the vehicle increases;

the prediction intervals are defined as an interval between adjacent prediction points in a prediction section for generating the prediction trajectory; and the adjusting of the prediction intervals includes:

adjusting a distance interval between adjacent prediction points as a respective prediction interval; and adjusting the prediction intervals to be wider with a constant change width as the distance from the vehicle increases.

* * * * *